(12) United States Patent
Yokokura et al.

(10) Patent No.: US 8,300,660 B2
(45) Date of Patent: Oct. 30, 2012

(54) TRANSMITTING APPARATUS

(75) Inventors: Ichiro Yokokura, Kawasaki (JP);
Hiromichi Makishima, Kawasaki (JP);
Shinji Sawane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 12/697,245

(22) Filed: Jan. 30, 2010

(65) Prior Publication Data

US 2010/0238954 A1 Sep. 23, 2010

(30) Foreign Application Priority Data

Mar. 19, 2009 (JP) ................................. 2009-068426

(51) Int. Cl.
*H04J 3/22* (2006.01)
(52) U.S. Cl. ........................................ 370/470; 370/474
(58) Field of Classification Search .................. 370/470, 370/474–477
See application file for complete search history.

(56) References Cited

U.S. PATENT DOCUMENTS

| | | | | |
|---|---|---|---|---|
| 7,277,386 B1* | 10/2007 | Ferguson et al. | ............. | 370/230 |
| 2002/0055365 A1* | 5/2002 | Yamato | ........................ | 455/466 |
| 2006/0251105 A1* | 11/2006 | Kim et al. | ..................... | 370/449 |
| 2008/0101398 A1* | 5/2008 | Ojala et al. | .................... | 370/412 |
| 2008/0225893 A1* | 9/2008 | Cave et al. | .................... | 370/476 |
| 2009/0092138 A1* | 4/2009 | Joo et al. | ....................... | 370/392 |
| 2010/0165863 A1* | 7/2010 | Nakata | ........................ | 370/252 |

FOREIGN PATENT DOCUMENTS

| | | |
|---|---|---|
| JP | 11-112245 A | 4/1999 |
| JP | 2006-050075 A | 2/2006 |

* cited by examiner

*Primary Examiner* — Gary Mui
(74) *Attorney, Agent, or Firm* — Fujitsu Patent Center

(57) ABSTRACT

A transmitting apparatus includes a detecting unit that detects deviation and balance relative to a specified bit rate of a frame signal input at a constant bit rate; a dividing unit that reads at constant intervals from a buffer storing the frame signal and outputs a signal divided into a plurality of segments having a predetermined data length; and a correcting unit that, based on the deviation and balance detected by the detecting unit, corrects the data length for the division by the dividing unit.

8 Claims, 16 Drawing Sheets

FIG.8

|  | ODU3 | ODU2 |
|---|---|---|
| LineClock FREQUENCY | 168.04 MHz | 168.04 MHz |
| SystemClock FREQUENCY | 155.52 MHz | 155.52 MHz |
| NUMBER OF PARALLEL CBR Data | 512 bit | 128 bit |
| CBR Enable INPUT RATE | 239/510 | (239/510)*(236/237) |
| NUMBER OF PARALLEL Segments | 128 bit | 128 bit |

FIG.10

|  | ODU3 | ODU2 |
|---|---|---|
| Tcycle | 52 | 57 |
| LengthB | 211 | 230 |
| MOVING AVERAGE NUMBER | 2048 | 2048 |

FIG.11

| MOVING AVERAGE NUMBER | NUMBER OF TIMES B+1 SELECTED | NUMBER OF TIMES B SELECTED | NUMBER OF TIMES B-1 SELECTED | NUMBER OF CONTINUOUS OUTPUTS OF B+1 | NUMBER OF CONTINUOUS OUTPUTS OF B | NUMBER OF CONTINUOUS OUTPUTS OF B-1 | LENGTH (AVERAGE) |
|---|---|---|---|---|---|---|---|
| 1 | 17340 | 0 | 36494 | 7 | 0 | 14 | 210.644203 |
| 2 | 17339 | 0 | 36495 | 7 | 0 | 13 | 210.644165 |
| 4 | 17341 | 0 | 36493 | 6 | 0 | 13 | 210.644240 |
| 8 | 17338 | 0 | 36496 | 6 | 0 | 13 | 210.644128 |
| 16 | 16537 | 1599 | 35698 | 7 | 1 | 13 | 210.644073 |
| 32 | 16491 | 1693 | 35650 | 6 | 1 | 13 | 210.644110 |
| 64 | 16263 | 2153 | 35418 | 6 | 1 | 12 | 210.644184 |
| 128 | 0 | 34678 | 19156 | 0 | 3 | 3 | 210.644165 |
| 256 | 0 | 34677 | 19157 | 0 | 3 | 3 | 210.644147 |
| 512 | 0 | 34678 | 19156 | 0 | 3 | 3 | 210.644165 |
| 1024 | 0 | 34678 | 19156 | 0 | 3 | 2 | 210.644165 |
| 2048 | 0 | 34676 | 19158 | 0 | 3 | 1 | 210.644128 |

FIG.16

| No. | LENGTH | No. | LENGTH | No. | LENGTH | No. | LENGTH |
|---|---|---|---|---|---|---|---|
| 1 | 211 | 16 | 210 | 31 | 211 | 46 | 210 |
| 2 | 210 | 17 | 211 | 32 | 211 | 47 | 211 |
| 3 | 211 | 18 | 211 | 33 | 210 | 48 | 211 |
| 4 | 211 | 19 | 210 | 34 | 211 | 49 | 210 |
| 5 | 210 | 20 | 211 | 35 | 210 | 50 | 211 |
| 6 | 211 | 21 | 211 | 36 | 211 | 51 | 211 |
| 7 | 211 | 22 | 210 | 37 | 211 | 52 | 210 |
| 8 | 210 | 23 | 211 | 38 | 210 | 53 | 211 |
| 9 | 211 | 24 | 210 | 39 | 211 | 54 | 211 |
| 10 | 211 | 25 | 211 | 40 | 211 | 55 | 210 |
| 11 | 210 | 26 | 211 | 41 | 210 | 56 | 211 |
| 12 | 211 | 27 | 210 | 42 | 211 | 57 | 210 |
| 13 | 210 | 28 | 211 | 43 | 211 | 58 | 211 |
| 14 | 211 | 29 | 211 | 44 | 210 | | |
| 15 | 211 | 30 | 210 | 45 | 211 | | |

TRANSMITTING APPARATUS

CROSS REFERENCE TO RELATED APPLICATIONS

This application is based upon and claims the benefit of priority of the prior Japanese Patent Application No. 2009-068426, filed on Mar. 19, 2009, the entire contents of which are incorporated herein by reference.

FIELD

The embodiments discussed herein are related to a transmitting apparatus that switches frame signals.

BACKGROUND

Conventionally, frame signals such as SONET and OTN frames, so-called constant bit rate (CBR) signals, are transferred to another apparatus through a transmitting apparatus. FIG. 17 is a block diagram of an internal configuration of a conventional transmitting apparatus. An add/drop multiplexer (ADM), for example, is applicable as the transmitting apparatus.

A transmitting apparatus 1500 includes interface cards 1501 (1501a to 1501n) and an SW card 1502 therein. Each of the interface cards 1501 has a segmenting unit 1511a that segments a CBR signal, and a CBR signal restoring unit 1511b that restores the CBR signal from the segmented signal inversely to the segmenting unit 1511a.

For example, a CBR signal input from a transmission path (line) to the interface card 1501a of the transmitting apparatus 1500 is divided into multiple segments by the segmenting unit 1511a of the interface card 1501a, band is expanded, and the segments are transferred to the SW card 1502. Paths in the SW card 1502 are switched through switching and reach the interface card 1501 corresponding to the switching (e.g., the CBR signal restoring unit 1511b of the interface card 1501n in the example depicted) (path A), and the segment-based signal is restored to the CBR signal and output to another transmission path as the CBR signal. Such a technique of dividing (e.g., cell-dividing) a CBR signal is disclosed in Japanese Laid-Open Patent Publication No. 2006-50075.

However, in the above conventional technology, an output phase of each segment is dependent on the input CBR signal and, if input and output rates are not integral multiples of each other and if the CBR signal has a deviation or data is input in an unbalanced manner (i.e., with data missing), the segment output phase fluctuates. To accommodate these situations, a circuit that absorbs fluctuations in the segment output phase is provided to increase the size of a buffer that temporarily stores CBR signals, etc.

SUMMARY

According to an aspect of an embodiment, a transmitting apparatus includes a detecting unit that detects deviation and balance relative to a specified bit rate of a frame signal input at a constant bit rate; a dividing unit that reads at constant intervals from a buffer storing the frame signal and outputs a signal divided into a plurality of segments having a predetermined data length; and a correcting unit that, based on the deviation and balance detected by the detecting unit, corrects the data length for the division by the dividing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a chart of setup conditions in the configuration of FIG. 7;
FIG. 10 is a chart of apparatus setup parameters;
FIG. 11 is a chart depicting segment length statistical information by moving average number;
FIG. 16 is a chart of setup contents of a base table.

DESCRIPTION OF EMBODIMENTS

Preferred embodiments of the present invention will be explained with reference to the accompanying drawings. A transmitting apparatus according to the embodiments determines a segment length to constrain segment output phase fluctuations, and even when there are deviations in an input signal, performs segmenting with arbitrary output characteristics in a manner that follows the deviations. The transmitting apparatus further transfers and outputs only normal segments at constant intervals.

Figure 1:
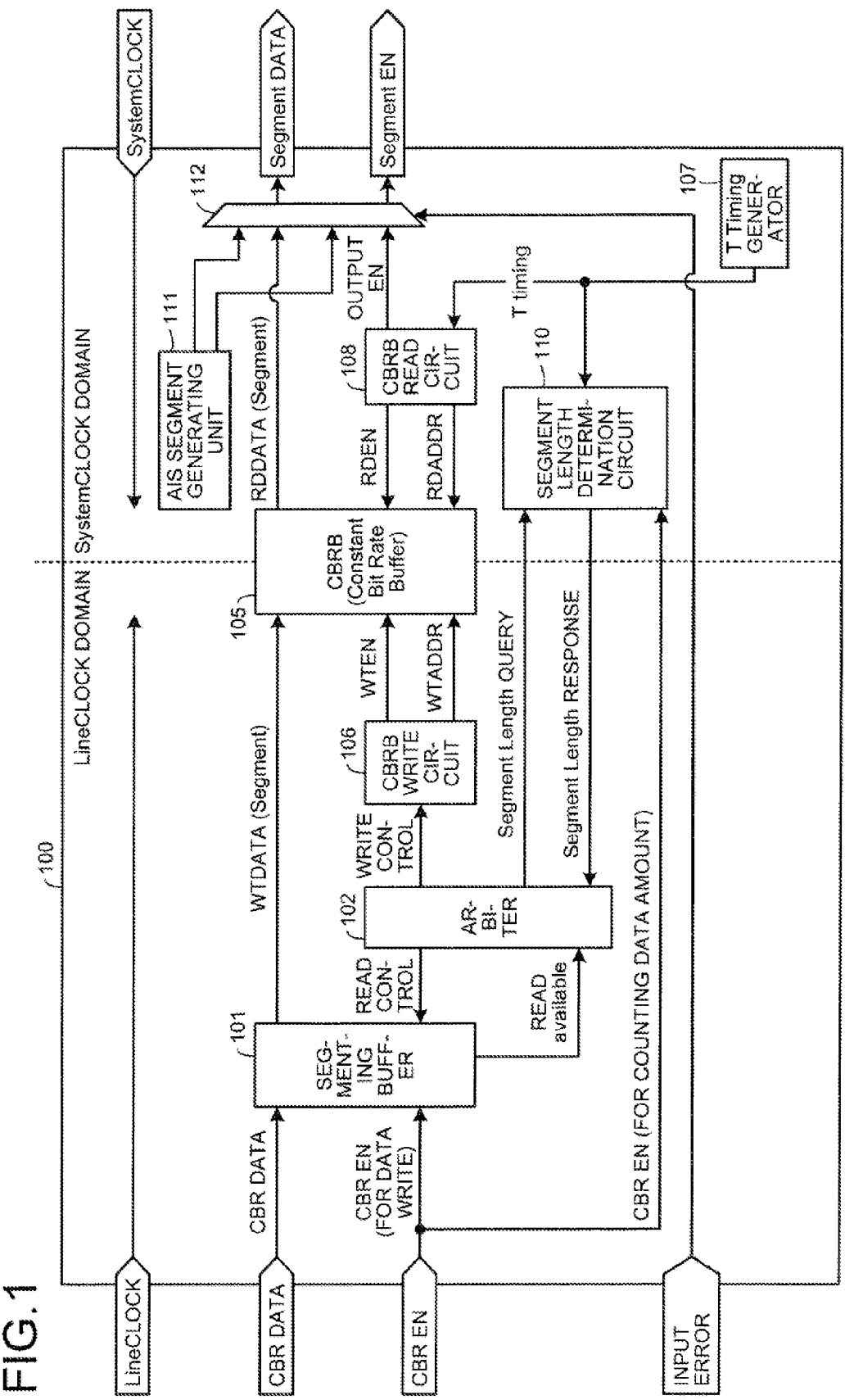
FIG. 1 is a block diagram of a configuration of a transmitting apparatus according to a first embodiment.

FIG. 1 is a block diagram of a configuration of a transmitting apparatus according to a first embodiment. FIG. 1 depicts an interface card 100 as a transmitting apparatus. The interface card 100 is disposed at the same position as the interface card provided within the transmitting apparatus 1500 described above. The interface card 100 includes a segment length determination circuit 110. Segment output phase fluctuations are constrained by disposal of the segment length determination circuit 110. Although the apparatus is operated overall by a system clock (SystemCLOCK) supplied to the apparatus, a CBR signal is asynchronous with the system clock since the CBR signal has deviated from the specified transfer rate or is input at a different data rate.

To a segmenting buffer 101, a CBR signal (CBR DATA) and an Enable amount (CBR EN) of the CBR signal are input. The segmenting buffer 101 has a capacity capable of storing a one-segment signal described later.

The segment length determination circuit 110 counts the Enable amount (CBR EN) of the CBR signal input in a T-section and calculates a moving average of the Enable amount in the T-section according to an externally specified parameter. Quantization by three reference values (B or B+1 or B−1) is performed with a threshold parameter B (in bytes) externally specified for the moving average result and the result is output as a segment length (Segment Length).

An arbiter 102 outputs a segment length query signal to the segment length determination circuit 110 and the response is acquired as a segment length response signal from the segment length determination circuit 110. The arbiter 102 performs the read control of the CBR signal from the segmenting buffer 101 and the write control for a CBRB write circuit 106 of a CBR buffer 105. The arbiter 102 sequentially reads the CBR signal from the segmenting buffer 101 according to the segment length determined by the segment length determination circuit 110. As a result, the CBR signal is output in segments and this signal (WTDATA) is written into the CBR buffer (CBRB) 105.

The segment-based signal written into the CBR buffer 105 is read at constant intervals T (corresponding to the T-section) using a system clock (SystemCLOCK) supplied to the apparatus and is transferred downstream. Therefore, a T-timing generator (T Timing Generator) 107 supplies a T-section timing signal (T Timing) to the segment length determination circuit 110 and a CBRB read circuit 108. The CBRB read circuit 108 reads a segment of the signal from the CBR buffer 105 at the constant intervals T and outputs the signal as a segment signal (Segment Data) to output segment Enable signal (Segment EN).

The segment length determination circuit 110, the arbiter 102, and the CBRB read circuit 108 described above function as a dividing unit that segments the CBR signal. The segment length determination circuit 110 further functions as a detecting unit that detects deviation and balance of the CBR signal relative to the specified bit rate and a correcting unit that corrects data length at the time of segmenting.

The interface card 100 also includes an input error indicating unit that outputs an alarm indication signal (AIS) when an input error occurs. Upstream from the interface card, a photoelectric converting module is disposed and, when the photoelectric converting module detects a disconnection of an optical signal, an input error signal is output. The interface card 100 is provided with an AIS segment generating unit 111 that generates an AIS segment and a selector 112 that switches the output of the CBR buffer 105 and the output of the AIS segment generating unit 111. When the input error signal is input to the selector 112, the selector 112 discards the segment read from the CBR buffer 105 to switch over to and output the AIS segment generated by the AIS segment generating unit 111.

Figure 2:
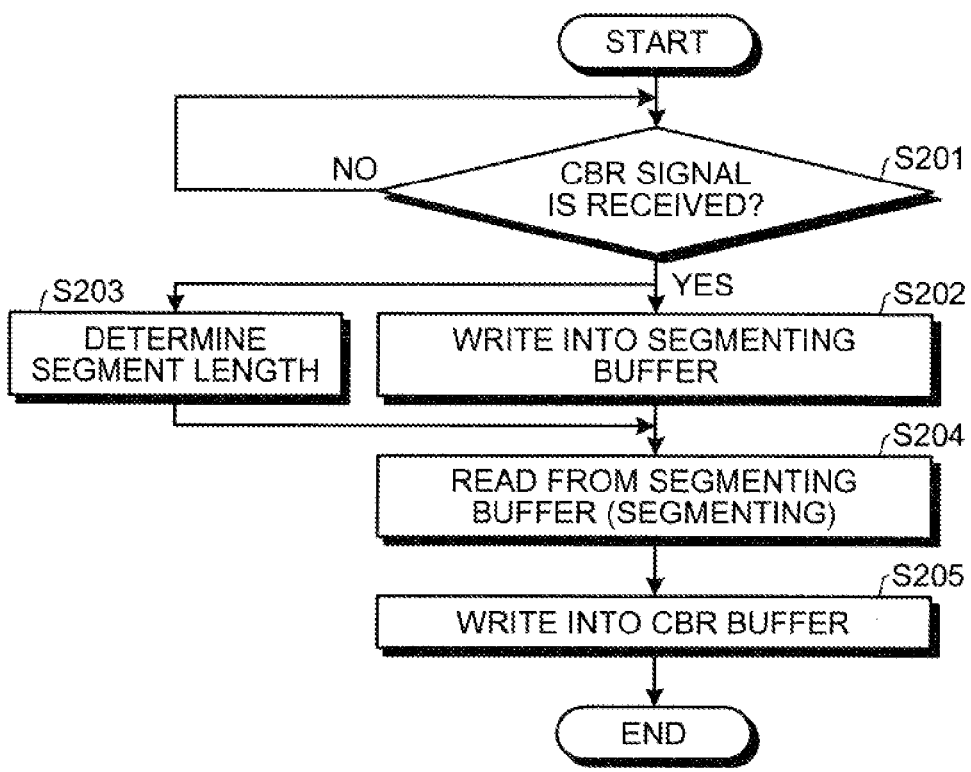
FIG. 2 is a flowchart of a write process to the CBR buffer.

FIG. 2 is a flowchart of a write process to the CBR buffer.

Reception of a CBR signal is waited for (step S201: NO) and when a CBR signal is received (step S201: YES), the CBR signal is directly written into the segmenting buffer 101 (step S202).

At this point, the segment length determination circuit 110 determines a segment length corresponding to the received CBR signal (step S203). The Enables of the input CBR signal (CBR EN) are branched and input to the segment length determination circuit 110, and the segment length determination circuit 110 counts the input Enable amount in the T-section and calculates a moving average of the Enable amount in the T-section according to an externally specified parameter. Quantization is performed by using any one of three values (B, B+1, B−1) with the threshold parameter B being externally specified for the moving average result and the result is output as a segment length to the arbiter 102.

In response to the CBR signal written into the segmenting buffer 101, the arbiter 102 reads the CBR signal according to the length determined by the segment length determination circuit 110 (step S204) and sequentially segments and writes the CBR signal to the CBR buffer 105 (step S205). During the period of receiving the CBR signal, the above process is repeatedly executed.

Figure 3:
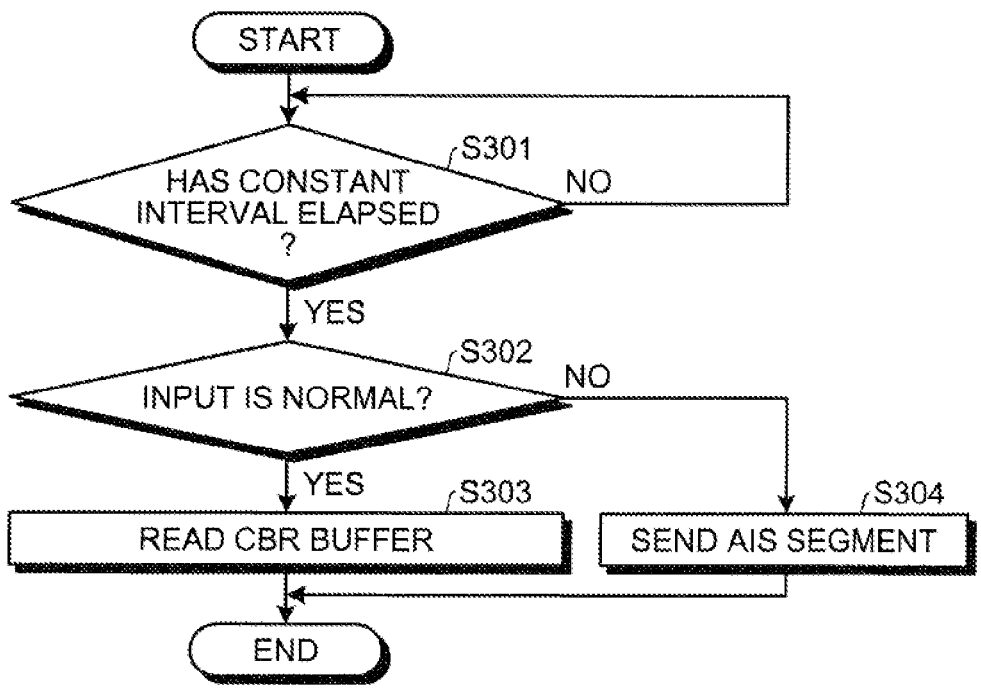
FIG. 3 is a flowchart of a read process from the CBR buffer.

FIG. 3 is a flowchart of a read process from the CBR buffer.

d) After waiting for the elapse of the constant interval T according to the system clock (SystemCLOCK) (step S301: NO), each time the constant interval T has elapsed (step S301: YES), the segment written into the CBR buffer 105 is read from the CBR buffer 105 (step S303), and transferred and output downstream.

After the processing at step S301, it is determined whether the input to the apparatus is normal (step S302). If it is determined that the input is normal, i.e., no input error signal has been received (step S302: YES), the read from the CBR buffer 105 at step S303 is performed. On the other hand, if an input error has occurred (step S302: NO), i.e., at the time of input an input error signal is received, the selector 112 is switched to discard the segment read from the CBR buffer 105 and to output the AIS segment generated by the AIS segment generating unit 111 (step S304).

Since the AIS segment is output at the time of abnormal input, the downstream apparatus may be notified of the abnormal state without transferring an erroneous segment. At the time of recovery from the errant input state, the transmitting apparatus is restarted and, after output of normal segments becomes available, the selector 112 is switched from the AIS segment output state, to the original state to recover the output of the normal segments.

According to the above processes of a) to d), the segment length determination circuit 110 counts Enables of the input CBR signal, calculates the deviation and balance of the CBR signal, and determines the optimal segment length transferred in the T-section. This enables segmenting with predetermined output characteristics in a manner that follows the input deviation of the CBR signal.

Figure 4:
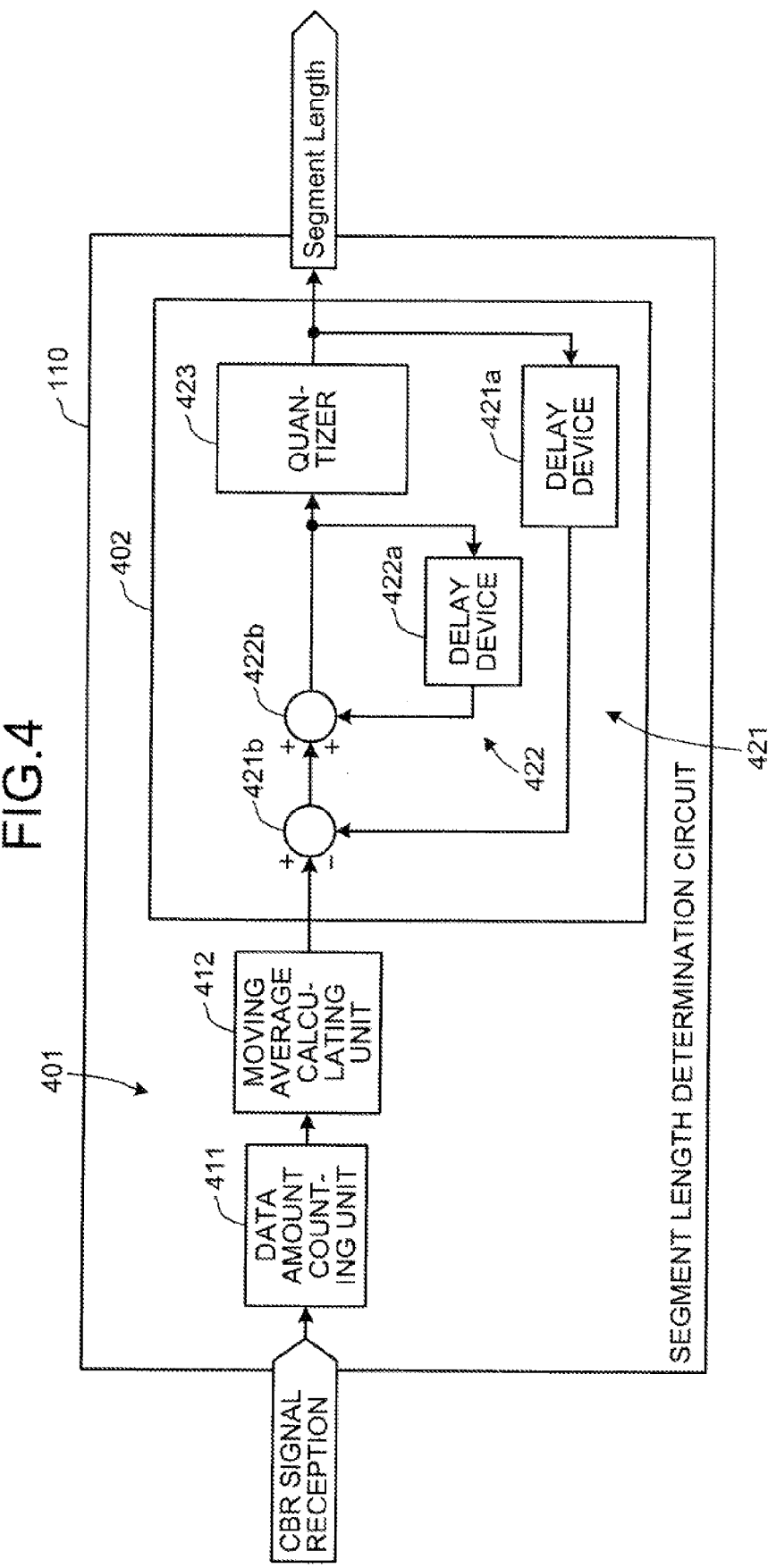
FIG. 4 is a block diagram of an internal configuration of a segment length determination circuit.

FIG. 4 is a block diagram of an internal configuration of the segment length determination circuit. The segment length determination circuit 110 is made up of a moving average circuit 401 and a delta-sigma modulator 402. The moving average circuit 401 is made up of a data amount counting unit 411 that counts a data amount of the input CBR signal in a predetermined section (input CBR EN) and a moving average calculating unit 412 that obtains an average data amount in a predetermined section (T-section). The delta-sigma modulator 402 has a general-purpose circuit configuration and is made up of a previous-quantization-result subtracting unit 421, a previous-quantization-input adding unit 422, and a quantizer 423.

The previous-quantization-result subtracting unit 421 is made up of a delay device 421a and a subtraction device 421b to subtract the quantization result of the previous time (before the T-section) from the moving average calculated by the moving average calculating unit 412. The previous-quantization-input adding unit 422 is made up of a delay device 422a and an addition device 422b to add the value input to the quantizer at the previous time (before the T-section) to the calculation result of the previous-quantization-result subtracting unit 421. As a result, the data quantized by the quantizer 423 is subjected to the feedback process of the quantization error of the previous time (before the T-section) through the calculations of the previous-quantization-result subtracting unit 421 and the previous-quantization-input adding unit 422.

Figure 5:
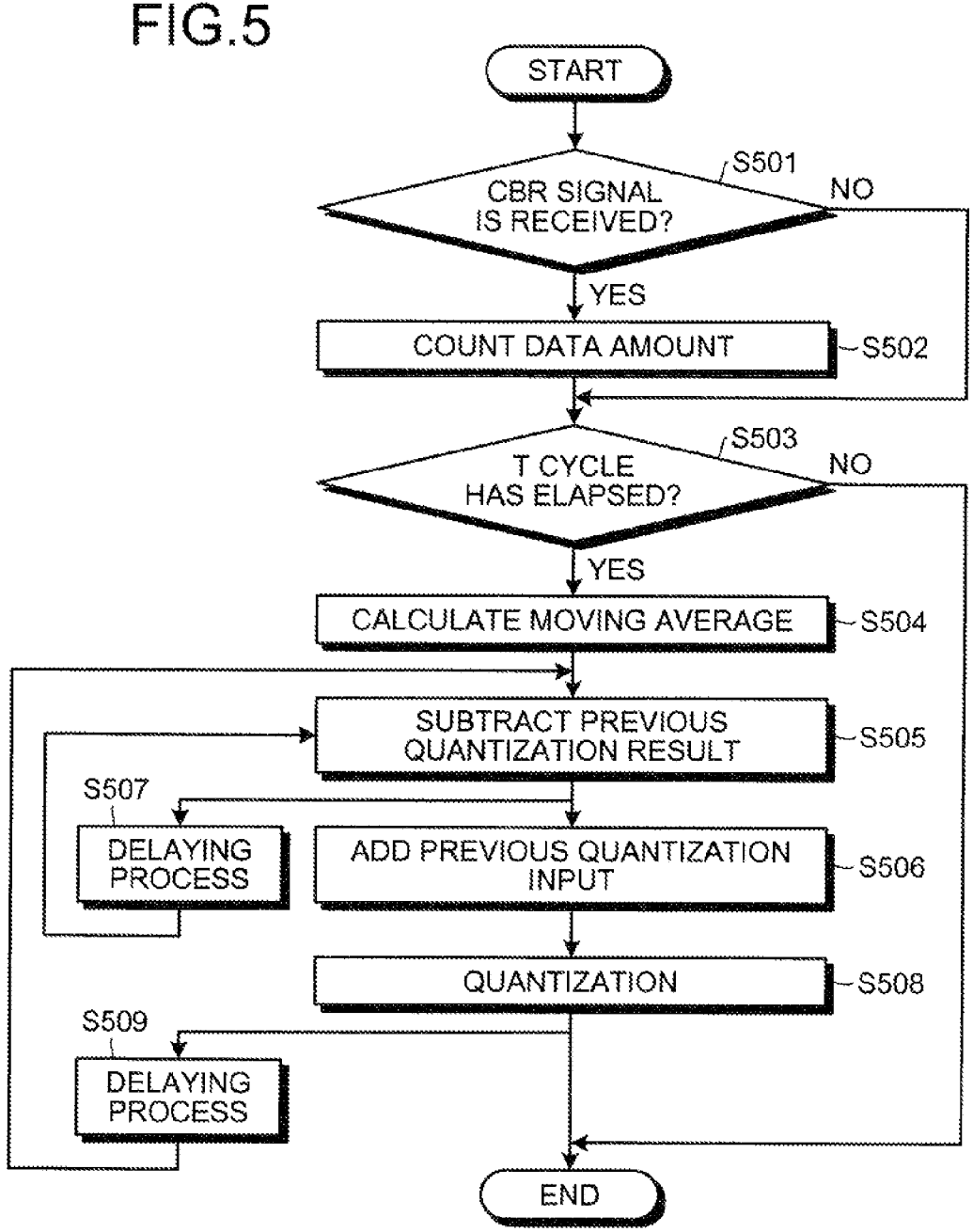
FIG. 5 is a flowchart of processing by the segment length determination circuit.

FIG. 5 is a flowchart of processing by the segment length determination circuit. When receiving a CBR signal (step S501: YES), the data amount counting unit 411 counts the data amount (step S502). For example, an input Enable amount in the T-section (ODU3=52, ODU2=57) is counted.

The moving average calculating unit 412 determines whether the T-section (T Cycle) has elapsed (step S503). If the time corresponding to the T-section has not elapsed (step S503: NO), the process is terminated without executing the subsequent process and if the T-section has elapsed (step S503: YES), the moving average calculation is performed (step S504). For example, the moving average is calculated by using a data amount corresponding to the parameter setting (ODU3=2048, ODU2=2048). The output characteristics may be changed by changing the parameter.

The previous-quantization-result subtracting unit 421 executes the subtraction process of the quantization result of the previous time (before the T-section) (step S505) and, subsequently, the previous-quantization-input adding unit 422 executes the addition process of adding the value input to the quantizer at the previous time (before the T-section) to the result (step S506). The processing at step S506 includes the delaying process by the delay device 421a (step S507) and the processing at step S508 includes a process of going back to step S505 to feed back the quantization error of the previous time (before the T-section) after the delaying process by the delay device 422a (step S509).

Subsequently, in the quantization by the quantizer 423 (step S508), the quantization is performed by using three values of B, B+1, and B−1 (bytes) centering on the threshold parameter B (ODU3=211, ODU2=230). The quantization result is used as the segment length (Segment Length).

The segment length determination circuit 110 counts Enables of the input CBR signal, calculates the deviation and balance of the CBR signal, and determines the optimal segment length to be transferred in the T-section. This enables segmenting with predetermined output characteristics in a manner that follows the input deviation of the CBR signal and enables normal segments alone to be transferred at constant intervals. Since it is not necessary to provide a special absorption circuit for absorbing the segment output phase fluctuation in a subsequent apparatus, this absorption circuit may be omitted.

Figure 6:
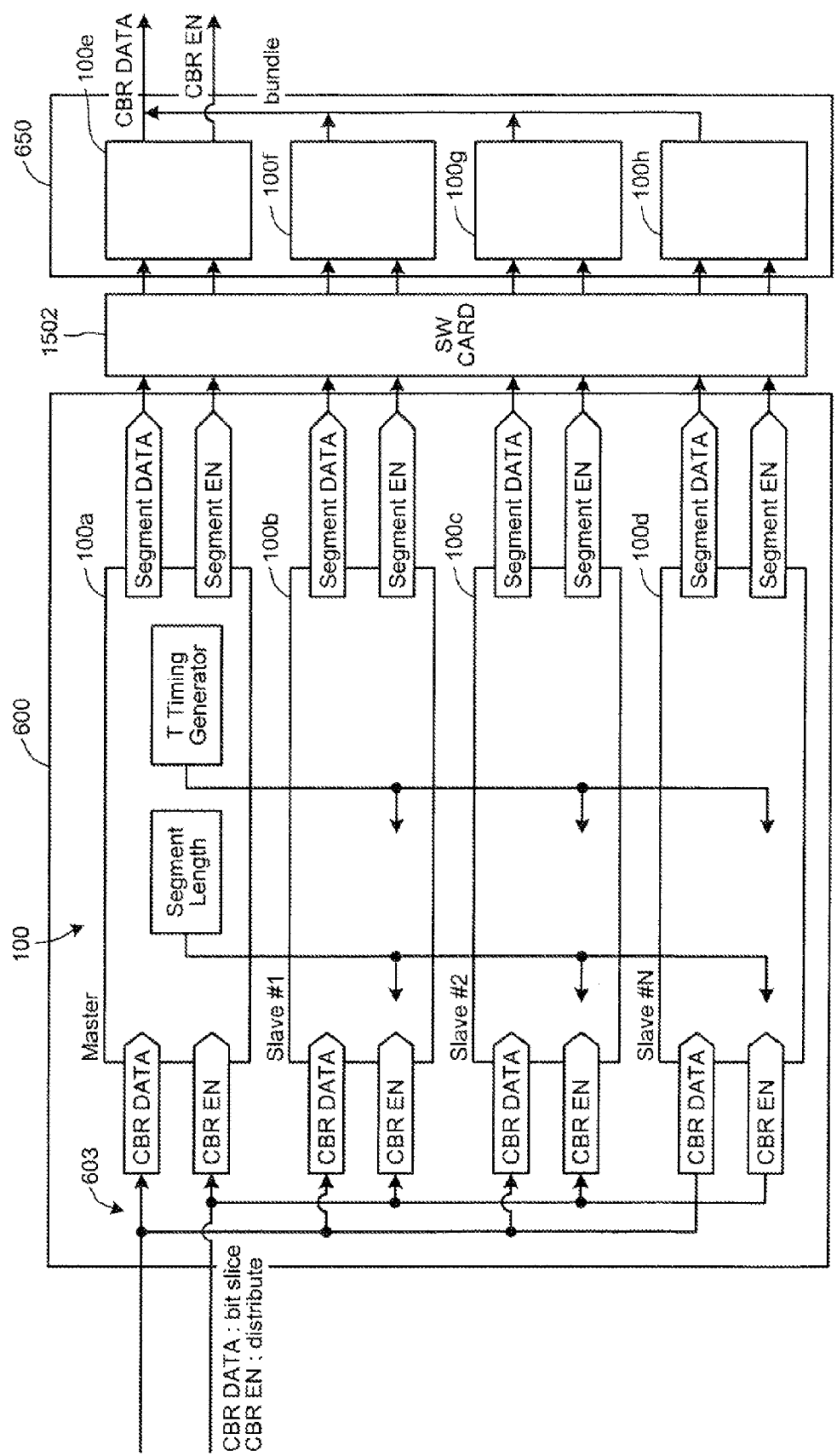
FIG. 6 is a block diagram of a configuration of a transmitting apparatus according to a second embodiment.

In the second embodiment, an exemplary configuration will be described that processes a CBR signal having a rate higher than the first embodiment. FIG. 6 is a block diagram of a configuration of a transmitting apparatus according to a second embodiment.

One interface unit 600 (DMUX side) having a configuration depicted in FIG. 6 is configured by mounting the N interface cards 100 depicted in FIG. 1 (in the depicted example, four cards 100a to 100d) in parallel. The one interface card 100a is operated as a master and the remaining three interface cards 100b to 100d are operated as slaves. The interface unit 600 segments a CBR signal and outputs the respective segments to the SW card 1502 and an interface unit 650 across the SW card 1502 restores and outputs the CBR signal from the segmented data. The interface unit 650 is configured by mounting the N interface cards 100 (100e to 100h) in parallel.

The CBR signal input to the interface unit 600 is bit-sliced and input to each of the N parallel interface cards 100a to 100d. On the input side of the interface unit 600, the data lines of the CBR signal (CBR DATA) and the Enable amount (CBR EN) of the CBR signal are connected in parallel such that the bit slice occurs at a dividing connection point 603 portion.

Among the interface cards 100a to 100d, the master interface card 100a outputs a segment length output by the segment length determination circuit 110 to the slave interface cards 100b to 100d. The master interface card 100a outputs a T-section timing signal (T Timing) output by the T-timing generator 107 to the slave interface cards 100b to 100d. The slave interface cards 100b to 100d are operated by the segment length and the T-section timing signal output from the master interface 100a.

With the above configuration, the slave interface cards 100b to 100d are capable of executing a process with the same data length and the same phase in conjunction with the master interface card 100a. Although the continuity of the payload in the original CBR signal is not maintained from the viewpoint of the output of one of the interface cards because the CBR signal is bit-sliced at the time of input, the interface unit 650 on the reception side may restore and output the original CBR signal since N segment reception circuits are mounted in parallel in the interface unit 650 on the reception side (MUX side).

Figure 7:
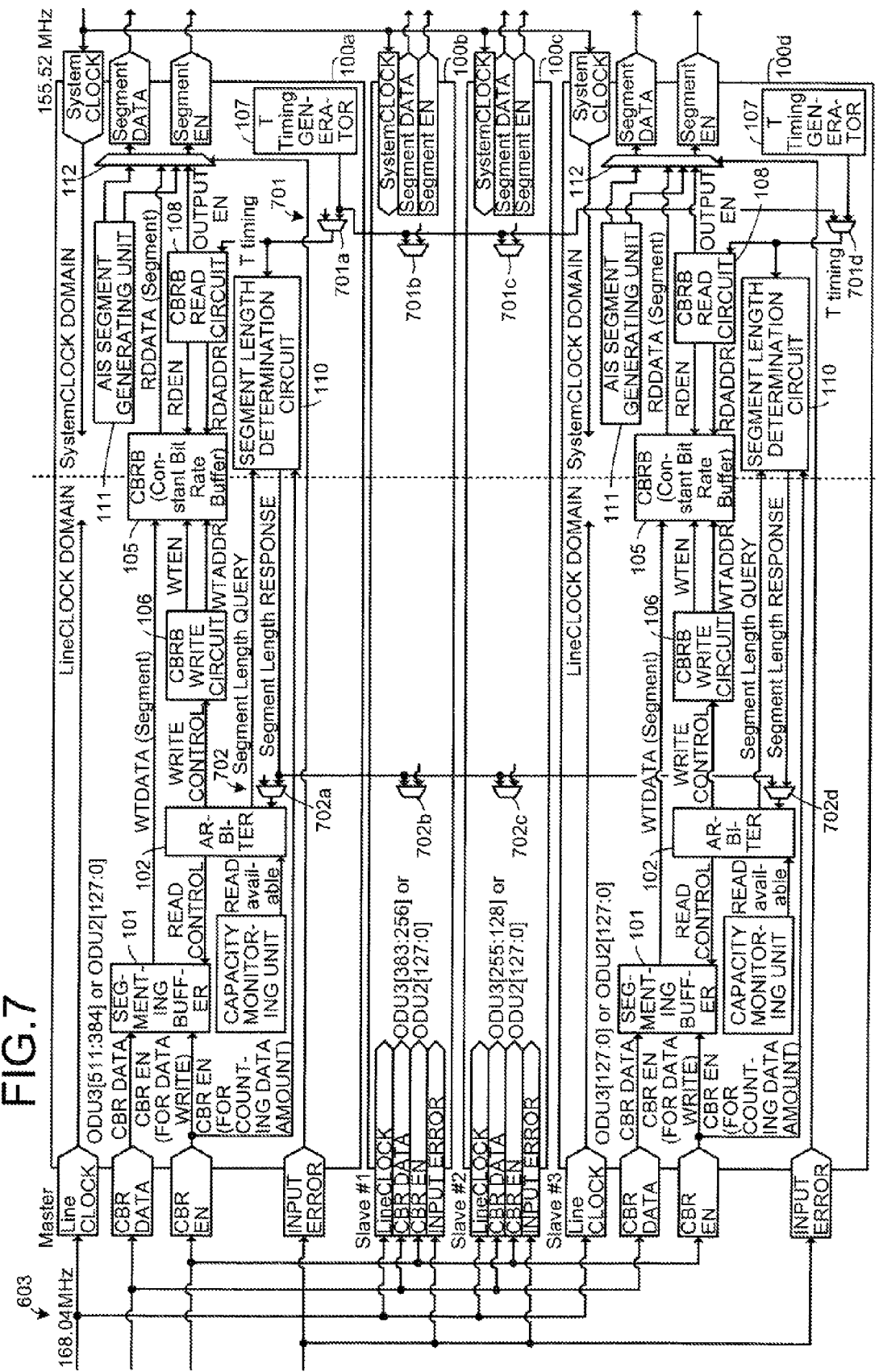
FIG. 7 is a block diagram of an internal configuration of an interface unit depicted in FIG. 6.

FIG. 7 is a block diagram of an internal configuration of the interface unit depicted in FIG. 6. The details of the interface unit 600 will be described. A segmenting/transferring circuit of ODU2 and ODU3 frames in OTN will be described as an example.

In the example depicted in FIG. 7, the interface cards 100 segmenting/transferring ODU2 are used and the four interface cards 100 (100a to 100d) are mounted in parallel to enable the segmenting/transferring of ODU3. In FIG. 7, the internal descriptions of the interface cards 100b, 100c are omitted. At the time of division/transfer of ODU2, four independent lines may concurrently be processed. In the case of ODU3, 512-bit input data is bit-sliced at the dividing connection point 603 by 128 bits and is connected to the interface cards 100a to 100d.

Each of the interface cards 100 (100a to 100d) is provided with a selector 701 (701a to 701d) and a selector 702 (702a to 702d). The selector 701 may switch utilization between the T-section timing signal (T Timing) output by the T-timing generator 107 of the interface card 100 of the selector 701 and the T-section timing signal output by the T-timing generator 107 of the master interface card 100a. The selector 702 may switch utilization between the segment length determination result output from the segment length determination circuit 110 of the interface card 100 of the selector 702 and the segment length determination result output from the segment length determination circuit 110 of the master interface card 100a.

In the case of ODU3, the slave interface cards 100b to 100c are operated by using the T-section timing signal output by the T-timing generator 107 of the master interface card 100a through the switching by the selectors 701, 702. To the slave interface cards 100b to 100c, the segment length that is output from the segment length determination circuit 110 of the master interface card 100a is input. As a result, an interlocking operation may be performed by outputting, to the slave interface cards 100b to 100d, the T-section timing signal and the segment length output from the master interface card 100a. Because of the interlocking operation, the segment output at the time of ODU3 is output with the same phase and the same segment length from the four interface cards 100a to 100d.

Figure 9:
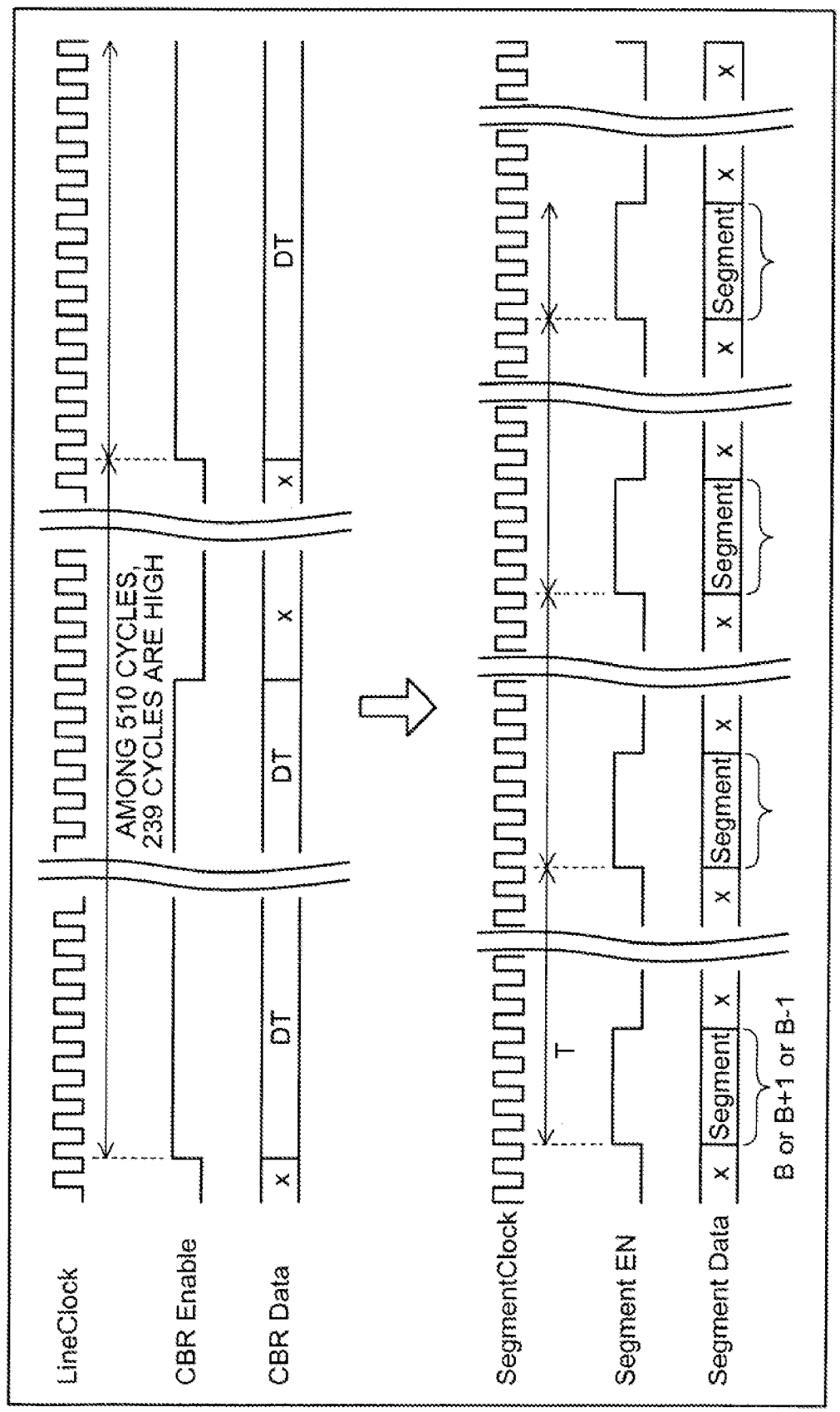
FIG. 9 is an input/output time chart of ODU3.

FIG. 8 is a chart of setup conditions in the configuration of FIG. 7. The setup conditions are external conditions of the setting such as an input clock (LineClock) frequency, system clock frequency of the apparatus, the number of parallel data of the input CRB signal, a CBR Enable (CBR EN) input rate, and the number of parallel output segments; values for ODU2 and ODU3 are depicted in the figure. FIG. 9 is an input/output time chart of ODU3. The upper side of FIG. 9 depicts a conventional configuration that does not implement the segmenting and, in this case, the CBR signal is irregularly missing (inverted) after enabled periods. On the other hand, with the configuration of the present embodiments, a segment is output consistently at the start of T-section for each T-section. The output segment length is one of three values, i.e., B serving as a reference, or B+1, or B−1.

FIG. 10 is a chart of apparatus setup parameters. FIG. 10 depicts T (Cycle), B (Length), and the moving average number in the above configuration for ODU2 and ODU3. Although multiple combinations of T and B exist, the combinations may be changed according to the processing ability of the subsequent circuit such as the SW card 1502. If a value is increased in the setting of the moving average number, the speed of following the deviation is slowed although the effect of the missing of the input signal is reduced. On the contrary, if the value is reduced, the speed of following the deviation is accelerated although the missing of the input signal characteristically tends to be affected by the segment length. The setting of the moving average number may also be changed according to the processing ability of the subsequent circuit. In FIG. 10, in the case of ODU3, since the four interface cards 100a to 100d are operated in parallel, the data amount output from the entire interface unit 600 corresponds to 211 bytes for every 52/4=13 cycles.

The units will be described with reference to FIGS. 1 and 4. The input CBR signal data of ODU2 or ODU3 is once written into the segmenting buffer 101, and the input Enable amount is used for the write into the segmenting buffer 101 and is delivered to the segment length determination circuit 110 at the same time. As depicted in FIG. 4, the segment length determination circuit 110 is made up of the moving average circuit 401 and the delta-sigma modulator 402.

First, the data count unit 411 counts the input Enable amount in the T-section (ODU3=52, ODU2=57) to calculate a moving average for the data set by the moving average circuit 401 (ODU3=2048, ODU2=2048). Although a remainder may be generated by this calculation, the remainder is fed back and added at the time of the next moving average calculation to prevent a calculation error from occurring. After adding "the previous value input to the quantizer—the previous value output from the quantizer (quantization result)", i.e., "quantization error" to the moving average calculation result, the quantizer 423 performs the quantization with one of three values of B, B+1, and B−1 centering on LengthB having the set number of bytes (B=211 in the case of ODU3 or B=230 in the case of ODU2). The quantization result is output as the segment length.

The arbiter 102 segments the data read from the segmenting buffer 101 by the length from the segment length determination circuit 110 and sequentially writes the data into the CBR buffer 105 capable of storing several segments. The read side of the CBR buffer 105 repeats a process of confirming that the data is written to a half of the capacity of the CBR buffer and then subsequently reads one segment for each T-section. This enables the segment output to be performed for each T-section, which is a constant interval.

Although the capacity of the CBR buffer 105 is not monitored, the CBR buffer 105 does not fall into the full or empty state since the segment having the Length (B, B+1, B−1) following the input deviation is read for each T-section. When an input error occurs, the segment read from the CBR buffer 105 is discarded and the generated AIS segment is output as described above to prevent transfer of the erroneous data downstream. The AIS segment is output having the predetermined length B (LengthB) for each T-section as in the case of the normal segment and is output with an AIS identification flag added to the segment payload area.

Figure 12:
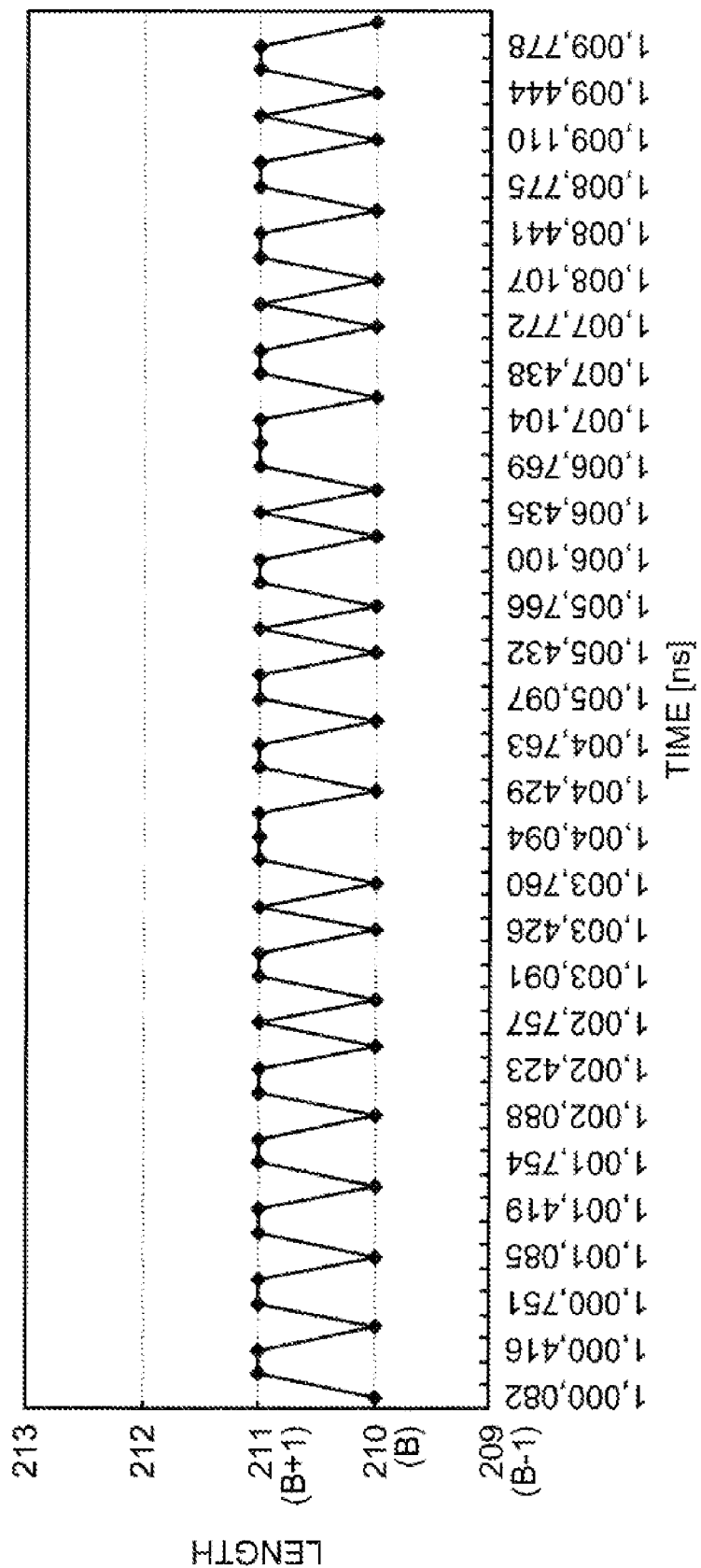
FIG. 12 is a graph of segment length distribution (part one)
Figure 13:
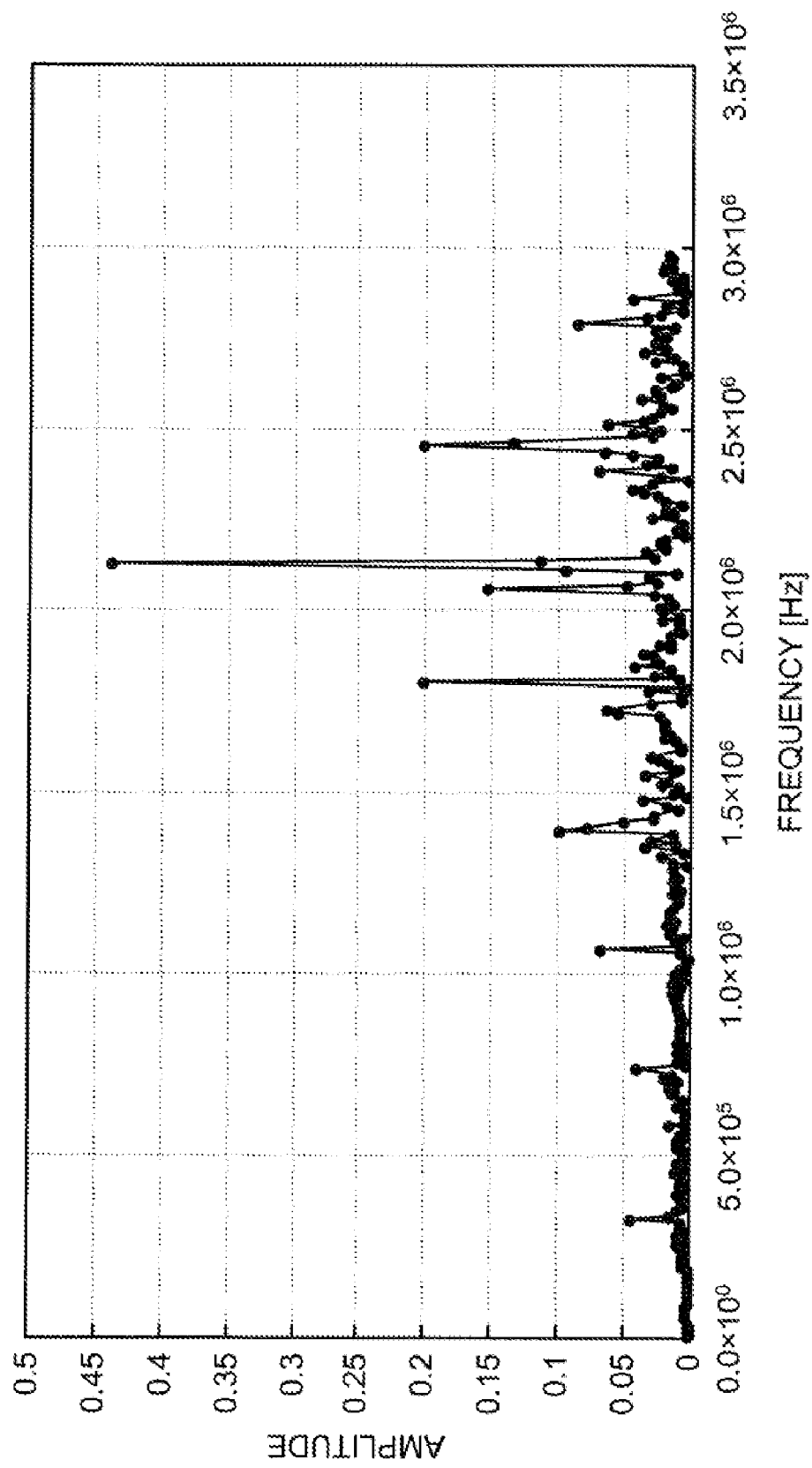
FIG. 13 is a graph of an output segment spectrum
Figure 14:
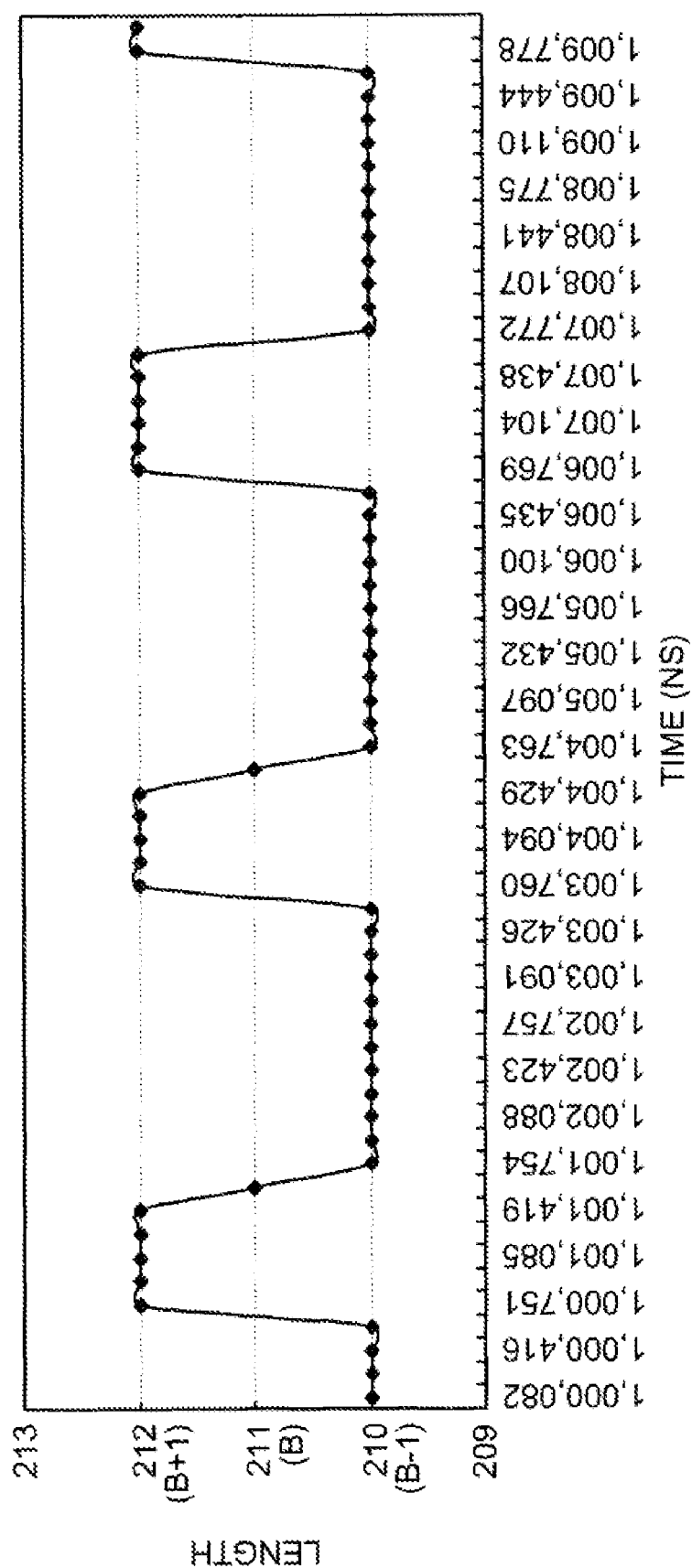
FIG. 14 is a graph of segment length distribution (part two)

FIG. 11 is a chart depicting segment length statistical information by moving average number; FIG. 12 is a graph of segment length distribution (part one); and FIG. 13 is graph of an output segment spectrum. FIGS. 11 to 13 indicate values in the segment output of ODU 3. As depicted in FIG. 11, if the moving average number is set larger, the segment length is stabilized with a tendency of the consecutive output of B (a reference). FIGS. 12 and 13 depict an example where the moving average number is 2048 and, as depicted in FIG. 12, if the moving average number is set larger, the segment length of the output segment is output with a value of B (a reference) (211 bytes), or B−1 (210 bytes). FIG. 14 is a graph of segment length distribution (part two). FIG. 14 depicts an example where the moving average number of ODU3 is 64 and when the moving average number is small as in this example, the segment length is not output as the segment length of B (a reference) and tends to be output as the segment length of B+1 or B−1 as depicted.

Although the second embodiment is configured to implement the fourfold data processing amount by using the four interface cards 100, a CBR signal having a higher bit rate may be subjected to the segmenting process by using not only four cards but N cards in a similar manner.

According to the second embodiment, a CBR signal having a higher rate becomes processable by using, in plural, the interface cards used in the first embodiment. A CBR signal having a higher rate is processed without changing the basic configuration of the circuit located on the subsequent state, such as the SW card 1502. At the time of expansion, the expansion may be supported by a simple configuration modification.

Figure 15:
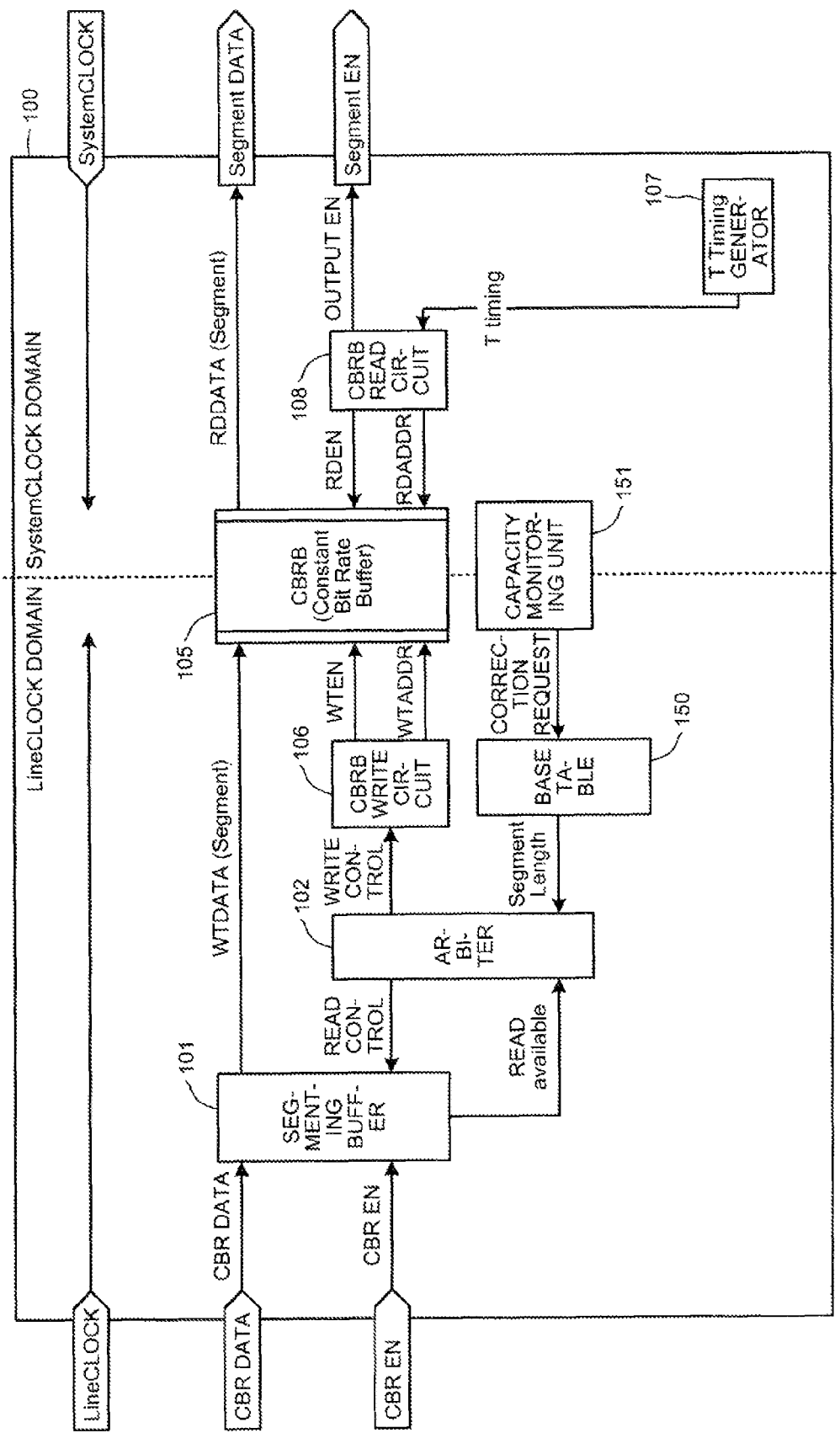
FIG. 15 is a block diagram of a configuration of a transmitting apparatus according to a third embodiment.
Figure 17:
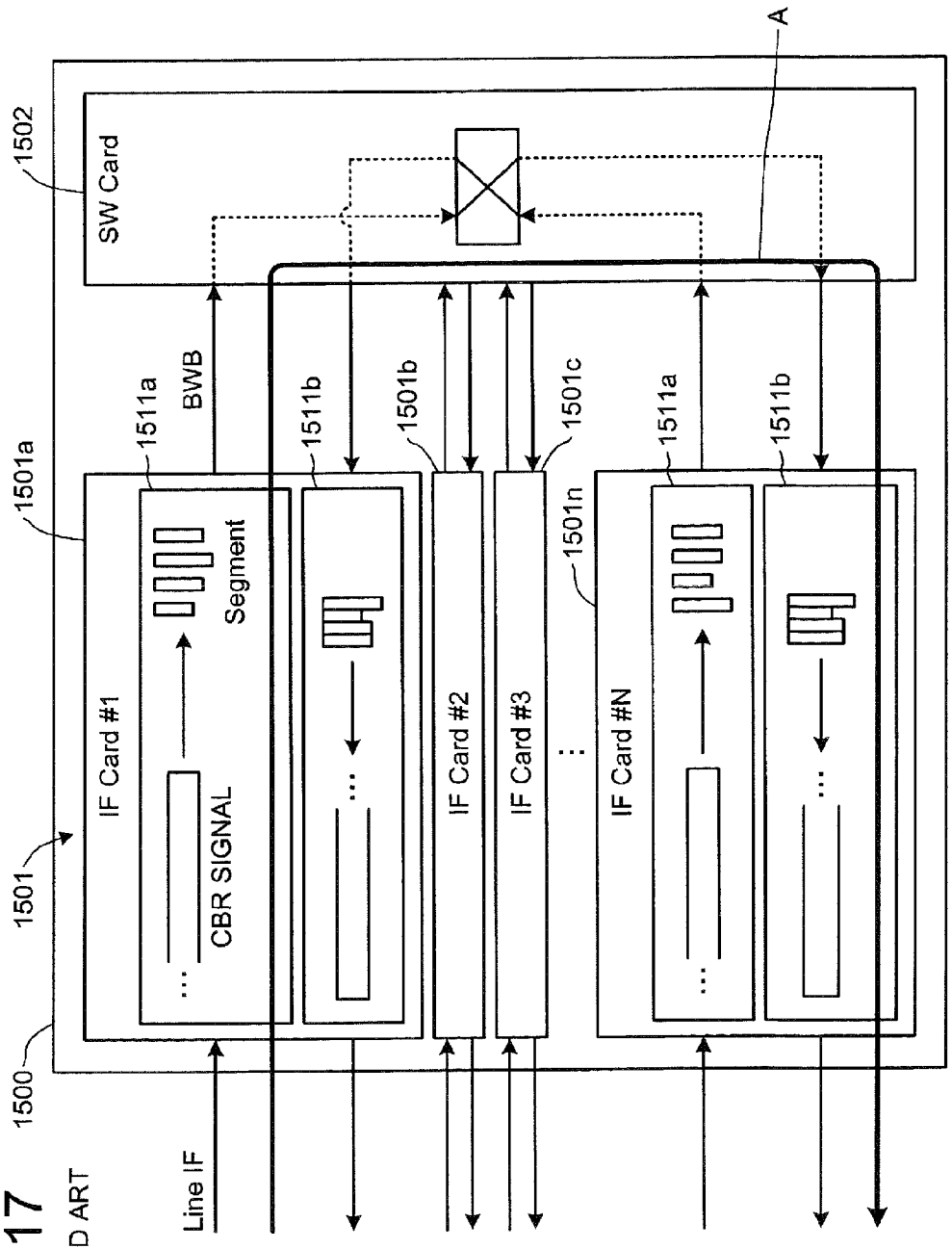
FIG. 17 is a block diagram of an internal configuration of a conventional transmitting apparatus.

A third embodiment is configured to use a table to perform the segmenting without the segment length determination used in the above embodiments. FIG. 15 is a block diagram of a configuration of a transmitting apparatus according to the third embodiment. As depicted in FIG. 15, the transmitting apparatus 100 is equipped with a base table 150 and a capacity monitoring unit 151. The base table 150 tabulates and sets for each segment length (hereinafter, B) a conversion rule expressed by the specified rate=T×B of the input CBR signal when segments are transferred at constant intervals (T-sections) using the system clock. The capacity monitoring unit 151 monitors the capacity of the CBR buffer 105 and corrects the segment length read out from the base table 150 according to the capacity.

The capacity monitoring unit 151 acts as a detecting unit that detects deviation and balance of the CBR signal relative to the specified bit rate. The base table 150, the arbiter 102, and the CBRB read circuit 108 function as a dividing unit that segments the CBR signal. The capacity monitoring unit 151 and the base table 150 function as a correcting unit that corrects data length at the time of the segmenting.

Operation via the above configuration will be described. The input CBR signal is directly written into the segmenting buffer 101. The arbiter 102 sequentially reads the CBR signal from the segmenting buffer 101 according to the segment length B read from the base table 150 and writes the segments into the CBR buffer 105. The segments written into the CBR buffer 105 are read out for the respective T-sections of constant intervals by using the system clock supplied to the apparatus, and are transferred and output to the subsequent apparatus.

FIG. 16 is a chart of setup contents of the base table. The base table 150 is a setting example when an ODU3 frame is segmented by a system clock of 311.04 (MHz), the number of parallel data is 128 (bits), and T=13 (cycles). In expressing the specified transmission rate by the T-sections and the two segment lengths B (201, 211), the result of a calculation indicates that, among 58 patterns, B=210 twenty-one times and B=211 thirty-seven times and, in the configuration depicting this result in FIG. 16, the number of items in the table may be set to a smaller value of 58. Therefore, when the CBR signal is segmented, the segments may be output having a segment length that corresponds to the specified transmission rate by performing an output of 210 bytes at a rate of 21 times out of 58 times and an output of 211 bytes for the remaining 37 times. Although the CBR signal is segmented and output as two types of segments of 210 bytes and of 211 bytes in this example, when the number of types is set to three and thereby using B (a reference)=210, B−1=209, and B+1=211 bytes, the follow-up speed is accelerated due to finer gradations and the variations of output characteristics may be increased although the number of items of the table is increased.

Since the actually input CBR signal has a data amount increased or decreased according to deviations with respect to the specified rate, the CBR buffer 105 may approach a full or empty state due to the difference between the actual deviation that occurs and the specified rate. To prevent this situation, the capacity monitoring unit 151 monitors the capacity of the CBR buffer 105. When the capacity of the CBR buffer 105 approaches a full state, to read more data from the CBR buffer 105, the reading of a larger number of bytes (211 bytes) may be performed more frequently relative to the reading of a smaller number of bytes (210 bytes). Further, when the capacity approaches an empty state, the reading of a smaller number of bytes (210 bytes) may be performed more frequently relative to the reading of a larger number of bytes (211 bytes) to read less data from the CBR buffer 105.

The configuration of the third embodiment as described is different only in the internal configuration as compared to other embodiments described above, and the interface cards 100 may be used in the same way as the transmitting apparatuses described in the embodiments.

According to the third embodiment described above, the CBR signal is output as divided segments having a simple configuration using a table. Even if a deviation from the specified rate occurs with respect to the input CBR signal, since the capacity of the CBR buffer may be monitored to correct the segment length B depending on the capacity, the data stored in the CBR buffer, which has a fixed capacity, is separated appropriately according to the deviation to thereby effectively utilize the CBR buffer to output the segments.

According to the present embodiments described above, data is segmented and a switching process is executed based on a segment length sufficiently shorter than the original frame length of the CBR signal, i.e., a unit within the apparatus, stable switching is implemented by using a buffer having a small capacity commensurate with the divided segments, i.e., without the use of a large-capacity buffer to wait for a frame necessary in the switching. According to the present embodiments, a special circuit, etc., for absorbing the segment output phase fluctuations need not be provided downstream from the apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitting apparatus comprising:
    a detecting unit that detects deviation and balance relative to a specified bit rate of a frame signal input at a constant bit rate;
    a dividing unit that reads, at constant intervals, from a buffer storing the frame signal and outputs a signal divided into a plurality of segments having a predetermined data length; and
    a correcting unit that, based on the deviation and balance detected by the detecting unit, corrects the data length for the division by the dividing unit, wherein
    the detecting unit detects the data amount when a specified transmission rate of the frame signal is divided at constant intervals,
    the correcting unit includes a moving average calculating unit that performs a moving average calculation of the data amount for each of the constant intervals, and based on a result of the moving average calculation by the moving average calculating unit, obtains the predetermined data length of the segments.

2. The transmitting apparatus according to claim 1, wherein
    the detecting unit detects a data amount of the input frame signal, and
    the correcting unit, based on the data amount, adjusts the predetermined data length of the segments.

3. The transmitting apparatus according to claim 1, wherein the correcting unit includes a delta-sigma modulator that receives input of the result of the moving average calculation by the moving average calculating unit and corrects an error.

4. The transmitting apparatus according to claim 1, wherein
    the detecting unit monitors a capacity of the buffer, and
    the dividing unit segments the frame signal based on a table that is preliminarily set correlating the constant intervals and the segment length divided at each of the constant intervals according to a specified transmission rate.

5. The transmitting apparatus according to claim 4, wherein the correcting unit corrects and reads the segment length in the table according to the capacity of the buffer.

6. The transmitting apparatus of according to claim 1, further comprising:
    a switching unit that is disposed downstream from the dividing unit and that switches a data path on a segment by segment basis, and
    a restoring unit that is disposed on downstream from the switching unit, and combines the segments to restore frame data.

7. The transmitting apparatus according to claim 1, further comprising:
    an input error indicating unit that, when an input error of the frame signal is detected, switches over from output of the segments to output of a segment indicative of an abnormal state.

8. The transmitting apparatus according to claim 1, further comprising:
    a plurality of interface cards, each of which includes the detecting unit, the dividing unit, and the correcting unit, wherein
    the frame signal is bit-sliced to be branched and input to the plurality of the interface cards to execute simultaneous parallel processing of the frame signal having a high bit rate.

* * * * *